(12) United States Patent
Abe et al.

(10) Patent No.: US 8,537,454 B2
(45) Date of Patent: Sep. 17, 2013

(54) DISPLAY MEDIUM DRIVER, NON-TRANSITORY COMPUTER-READABLE MEDIUM, DISPLAY DEVICE, AND METHOD OF DRIVING DISPLAY MEDIUM

(75) Inventors: Masaaki Abe, Kanagawa (JP);
Yoshinori Machida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 12 days.

(21) Appl. No.: 13/209,103

(22) Filed: Aug. 12, 2011

(65) Prior Publication Data

US 2012/0170105 A1   Jul. 5, 2012

(30) Foreign Application Priority Data

Jan. 5, 2011  (JP) ................................. 2011-000528

(51) Int. Cl.
*G02B 26/00*  (2006.01)
(52) U.S. Cl.
USPC .......................................... 359/296; 345/107
(58) Field of Classification Search
USPC ..................... 359/296; 345/107, 20, 42, 204, 345/690, 520, 531, 105
See application file for complete search history.

(56) References Cited

U.S. PATENT DOCUMENTS

| | | | | |
|---|---|---|---|---|
| 7,936,499 | B2 * | 5/2011 | Kim et al. ..................... | 359/296 |
| 8,115,729 | B2 * | 2/2012 | Danner et al. ................ | 345/107 |
| 2007/0188509 | A1 | 8/2007 | Shigehiro et al. | |
| 2008/0036731 | A1 | 2/2008 | Shigehiro et al. | |
| 2008/0117165 | A1 | 5/2008 | Machida et al. | |
| 2008/0278436 | A1 | 11/2008 | Sato | |

FOREIGN PATENT DOCUMENTS

| | | |
|---|---|---|
| JP | A-2005-292256 | 10/2005 |
| JP | A-2007-187937 | 7/2007 |
| JP | A-2007-249188 | 9/2007 |
| JP | A-2008-129179 | 6/2008 |
| JP | A-2008-170626 | 7/2008 |

\* cited by examiner

*Primary Examiner* — Tuyen Tra
(74) *Attorney, Agent, or Firm* — Oliff & Berridge, PLC

(57) ABSTRACT

A display medium driver includes a translucent display substrate, a rear substrate that is opposed to the display substrate with a gap interposed therebetween, a dispersion medium enclosed between the substrates, a first particle group dispersed in the dispersion medium so as to migrate by applying a first voltage across the substrates, and a second particle group dispersed in the dispersion medium so as to migrate by applying a second voltage across the substrates, the driver including a setting unit setting a voltage value and a voltage application time of the first voltage with which the first particle group does not migrate at the time of causing the second particle group to migrate depending on a display density of the second particle group and a voltage application unit first applying the first voltage across the substrates and then applying the second voltage across the substrates.

4 Claims, 22 Drawing Sheets

FIG. 11

|  | $V_{thM3}$ | $V_{thM2}$ | $V_{thM1}$ |
|---|---|---|---|
| $D_{C0}$ | △ | △ | ○ |
| $D_{C1}$ | △ | △ | ○ |
| $D_{C2}$ | △ | ○ | × |
| $D_{C3}$ | ○ | × | × |

○ : NO MIXED COLOR, HIGH SPEED
△ : NO MIXED COLOR
× : MIXED COLOR

FIG. 14

|  | $V_{thM3}$ | $V_{thM2}$ | $V_{thM1}$ |
|---|---|---|---|
| $D_{C0}$ | ○ | × | × |
| $D_{C1}$ | △ | ○ | × |
| $D_{C2}$ | △ | △ | ○ |
| $D_{C3}$ | △ | △ | ○ |

○ : NO MIXED COLOR, HIGH SPEED
△ : NO MIXED COLOR
× : MIXED COLOR

FIG. 20

| CYAN PARTICLE DENSITY | DRIVING TIME [S] IN SECOND STROKE OF MAGENTA PARTICLE WITH VOLTAGE FIXED TO 15 V | | | |
|---|---|---|---|---|
| | 1.0 | 0.6 | 0.3 | 0.2 |
| $D_{C3}$ | ◯ (1.0) | ◯ (0.6) | ◯ (0.3) | ◯ (0.2) |
| $D_{C2}$ | ◯ (2.2) | ◯ (1.8) | ◯ (1.5) | × (1.4) |
| $D_{C1}$ | ◯ (1.8) | ◯ (1.4) | × (1.1) | × (1.0) |
| $D_{C0}$ | ◯ (1.6) | × (1.2) | × (0.9) | × (0.8) |

◯ : △E<5
× : △E≧5
TOTAL DRIVING TIME IN PARENTHESIS

FIG. 21

| | DRIVING TIME [S] IN SECOND STROKE OF MAGENTA PARTICLE WITH VOLTAGE FIXED TO 30 V | | | |
|---|---|---|---|---|
| | 0.20 | 0.14 | 0.08 | 0.05 |
| $D_{C3}$ | ○ (0.20) | ○ (0.14) | ○ (0.08) | ○ (0.05) |
| $D_{C2}$ | ○ (1.40) | ○ (1.34) | ○ (1.28) | × (1.25) |
| $D_{C1}$ | ○ (1.00) | ○ (0.94) | × (0.88) | × (0.85) |
| $D_{C0}$ | ○ (0.80) | × (0.74) | × (0.68) | × (0.65) |

CYAN PARTICLE DENSITY

○ : ΔE<5
× : ΔE≥5
TOTAL DRIVING TIME IN PARENTHESIS

FIG. 23

| DRIVING CONDITION IN SECOND STROKE OF CYAN PARTICLE | | CYAN DENSITY |
|---|---|---|
| DRIVING VOLTAGE [V] | DRIVING TIME [s] | |
| 0 | 0.0 | $D_{C3}$ (100%) |
| 3 | 1.2 | $D_{C2}$ (67%) |
| 6 | 0.8 | $D_{C1}$ (33%) |
| 8 | 0.6 | $D_{C0}$ (0%) |

DISPLAY MEDIUM DRIVER, NON-TRANSITORY COMPUTER-READABLE MEDIUM, DISPLAY DEVICE, AND METHOD OF DRIVING DISPLAY MEDIUM

CROSS-REFERENCE TO RELATED APPLICATIONS

This application is based on and claims priority under 35 USC 119 from Japanese Patent Application No. 2011-000528 filed Jan. 5, 2011.

BACKGROUND

Technical Field

The present invention relates to a display medium driver, a non-transitory computer-readable medium, a display device, and a method of driving a display medium.

SUMMARY

According to an aspect of the invention, there is provided a display medium driver including a display substrate that has translucency, a rear substrate that is opposed to the display substrate with a gap interposed therebetween, dispersion medium that is enclosed between the display substrate and the rear substrate, plural types of particle groups that are dispersed in the dispersion medium, that are enclosed between the substrates so as to migrate between the substrates depending on an electric field formed between the substrates, and that are different from each other in color and charged polarity, the driver including: a setting unit that sets a voltage value and a voltage application time of a first voltage with which a first particle group among the plural types of particle groups does not migrate at the time of causing a second particle group to migrate depending on a display density of the second particle group when the second particle group of which the absolute value is smaller than a first threshold value is caused to migrate after the first particle group is caused to migrate by applying the first voltage equal to or greater than the first threshold value across the substrates; and a voltage application unit that first applies the first voltage set by the setting unit across the substrates and then applies the second voltage across the substrates.

BRIEF DESCRIPTION OF THE DRAWINGS

Exemplary embodiments of the present invention will be described in detail based on the following figures, wherein:

FIG. 11 is a table illustrating the relationship between threshold characteristics of magenta particles and the density and mixed color of cyan particles;

FIG. 14 is a table illustrating the relationship between threshold characteristics of magenta particles and the density and mixed color of cyan particles;

FIG. 20 is a table illustrating the relationship between a voltage in a second stroke of magenta particles and the density and mixed color of cyan particles;

FIG. 21 is a table illustrating the relationship between a voltage in a second stroke of magenta particles and the density and mixed color of cyan particles;

FIG. 23 is a table illustrating the relationship between a driving condition and a density in a second stroke of cyan particles.

DETAILED DESCRIPTION

Figure 1A:
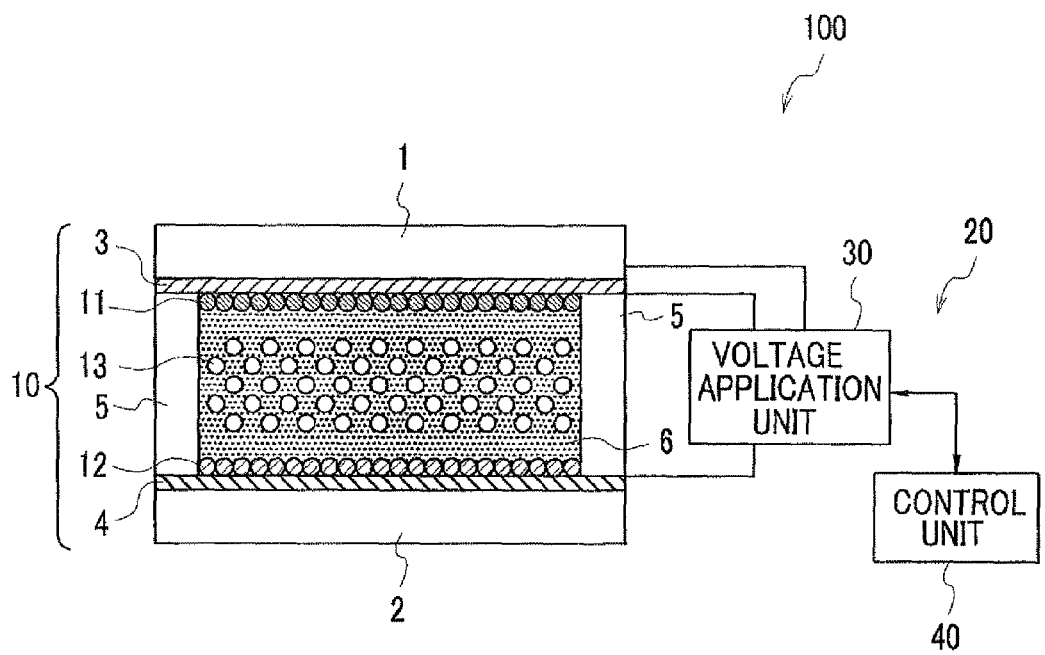
FIGS. 1A and 1B are diagrams schematically illustrating a display device.

Hereinafter, exemplary embodiments of the invention will be described with reference to the accompanying drawings. Elements having the same operation and function are referenced by the same reference numerals and signs in the entire drawings, and the description may not be repeated. For the purpose of facilitating the explanation, the exemplary embodiments will be described by focusing on a cell.

Particles of cyan are referred to as cyan particles C, particles of magenta are referred to as magenta particles M, particles of yellow are referred to as yellow particles Y, and the particles and particle groups are referenced by the same signs (reference signs).

FIG. 1A schematically illustrates a display device according to an exemplary embodiment of the invention. The display device 100 includes a display medium 10 and a driver 20 driving the display medium 10. The driver 20 includes a voltage application unit 30 that applies a voltage across a display electrode 3 and a rear electrode 4 of the display medium 10 and a control unit 40 that controls the voltage application unit 30 on the basis of image information of an image to be displayed by the display medium 10.

In the display medium 10, the display substrate 1 having translucency and serving as an image display surface and the rear substrate 2 serving as a non-display surface are opposed to each other with a gap interposed therebetween. Spacer members 5 that maintain the substrates 1 and 2 with a predetermined gap and that partition the space between the substrates into plural cells are provided.

A cell represents a region surrounded with the rear substrate 2 having a rear electrode 4 formed thereon, the display substrate 1 having a display electrode 3 formed thereon, and the spacer members 5. In the cell, a dispersion medium 6 containing, for example, an insulating liquid and a first particle group 11, a second particle group 12, and a white particle group 13 which are dispersed in the dispersion medium 6 are enclosed.

The first particle group 11 and the second particle group 12 are different from each other in color and charged polarity and have a characteristic in which the first particle group 11 and the second particle group 12 independently migrate by applying a voltage equal to or greater than a predetermined threshold voltage across the pair of electrodes 3 and 4. On the other hand, the white particle group 13 is a particle group that has a smaller amount of electric charge than those of the first particle group 11 and the second particle group 12 and does not migrate to any electrode even when a voltage with which the first particle group 11 and the second particle group 12 migrate to any electrode is applied across the electrodes.

By mixing a coloring agent into the dispersion medium, white other than the colors of the migration particles may be displayed.

The driver 20 (the voltage application unit 30 and the control unit 40) causes the particles groups 11 and 12 to migrate by applying a voltage corresponding to a color to be displayed across the display electrode 3 and the rear electrode 4 of the display medium 10, and attracts the particle groups to any one of the display substrate 1 and the rear substrate 2 depending on the charged polarities.

The voltage application unit 30 is electrically connected to the display electrode 3 and the rear electrode 4. The voltage application unit 30 is connected to the control unit 40 so as to transmit and receive signals thereto and therefrom.

Figure 1B:
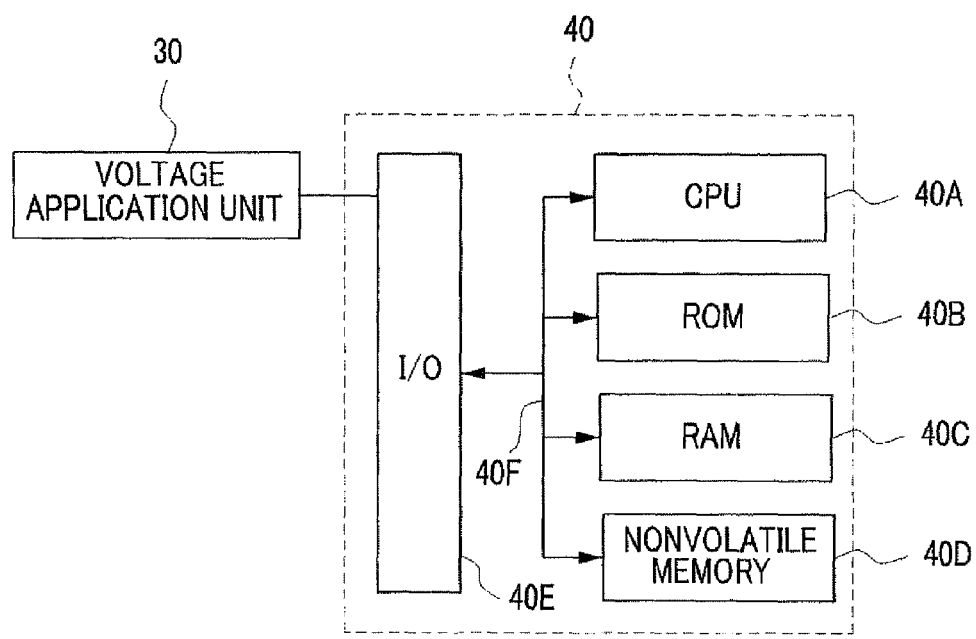

As shown in FIG. 1B, the control unit 40 includes, for example, a computer 40. In the computer 40, a central processing unit (CPU) 40A, a read only memory (ROM) 40B, a random access memory (RAM) 40C, a nonvolatile memory 40D, and an input and output interface (I/O) 40E are connected to each other via a bus 40F. The voltage application unit 30 is connected to the I/O 40E. In this case, a program causing the computer 40 to execute a process of instructing the voltage application unit 30 to apply a voltage necessary for displaying various colors is written to, for example, the nonvolatile memory 40D and is read and executed by the CPU 40A. The program may be provided through the use of a recording medium such as a CD-ROM.

The voltage application unit 30 is a voltage applying device applying a voltage across the display electrode 3 and the rear electrode 4, and applies a voltage across the display electrode 3 and the rear electrode 4 under the control of the control unit 40.

In this exemplary embodiment, for example, it is assumed that the rear electrode 4 is grounded and a voltage is applied to the display electrode 3.

Figure 2:
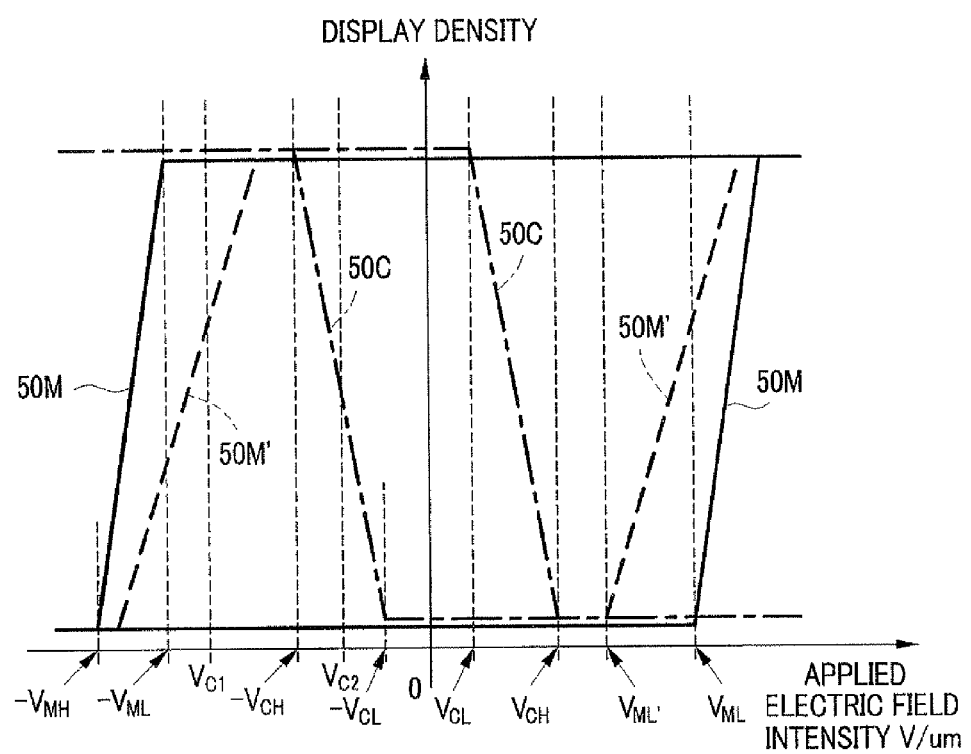
FIG. 2 is a diagram illustrating threshold characteristics of migration particles.

FIG. 2 illustrates the relationship (threshold characteristics) between the electric field intensity (V/μm) to be applied across the substrates and the display density based on the particle groups when the rear electrode 4 is grounded (0 V) and a voltage is applied to the display electrode 3. In FIG. 2, the threshold characteristic of cyan particles C is represented by 50C and the threshold characteristic of magenta particles M is represented by 50M. In this exemplary embodiment, for example, it is assumed that the magenta particles M are charged negatively and the cyan particles C are charged positively.

As shown in FIG. 2, the electric field intensity (the threshold electric field intensity) with which the negatively-charged magenta particles M close to the rear substrate 2 start the migration to the display substrate 1 is $+V_{ML}$ and the electric field intensity (the threshold electric field intensity) with which all the magenta particles M end the migration to the display substrate 1 is $+V_{MH}$. The electric field intensity (the threshold electric field intensity) with which the magenta particles M close to the display substrate 1 start the migration to the rear substrate 2 is $-V_{ML}$ and the electric field intensity (the threshold electric field intensity) with which all the magenta particles M end the migration to the rear substrate 2 is $-V_{MH}$.

Therefore, the magenta particles M close to the rear substrate 2 start the migration to the display substrate 1 by applying the electric field intensity equal to or greater than $+V_{ML}$ across the substrates, and all the magenta particles M migrate to the display substrate 1 by applying the electric field intensity equal to or greater than $+V_{MH}$ across the substrates. The magenta particles M close to the display substrate 1 start migration to the rear substrate 2 by applying the electric field intensity equal to or less than $-V_{ML}$ across the substrates, and all the magenta particles M migrate to the rear substrate 2 by applying the electric field intensity equal to or less than $-V_{MH}$ across the substrates.

The electric field intensity (the threshold electric field intensity) with which the cyan particles C close to the rear substrate 2 start the migration to the display substrate 1 is $-V_{CL}$ and the electric field intensity (the threshold electric field intensity) with which all the cyan particles C end the migration to the display substrate 1 is $-V_{CH}$. The electric field intensity (the threshold electric field intensity) with which the cyan particles C close to the display substrate 1 start the migration to the rear substrate 2 is $+V_{CL}$ and the electric field intensity (the threshold electric field intensity) with which all the cyan particles C end the migration to the rear substrate 2 is $+V_{CH}$.

Therefore, the cyan particles C close to the rear substrate 2 start the migration to the display substrate 1 by applying the electric field intensity equal to or less than $-V_{CL}$, and all the cyan particles C migrate to the display substrate 1 by applying the electric field intensity equal to or less than $-V_{CH}$ across the substrates. The cyan particles C close to the display substrate 1 start the migration to the rear substrate 2 by applying the electric field intensity equal to or greater than $+V_{CL}$, and all the cyan particles C migrate to the rear substrate 2 by applying the electric field intensity equal to or greater than $+V_{CH}$ across the substrates.

Figure 3:
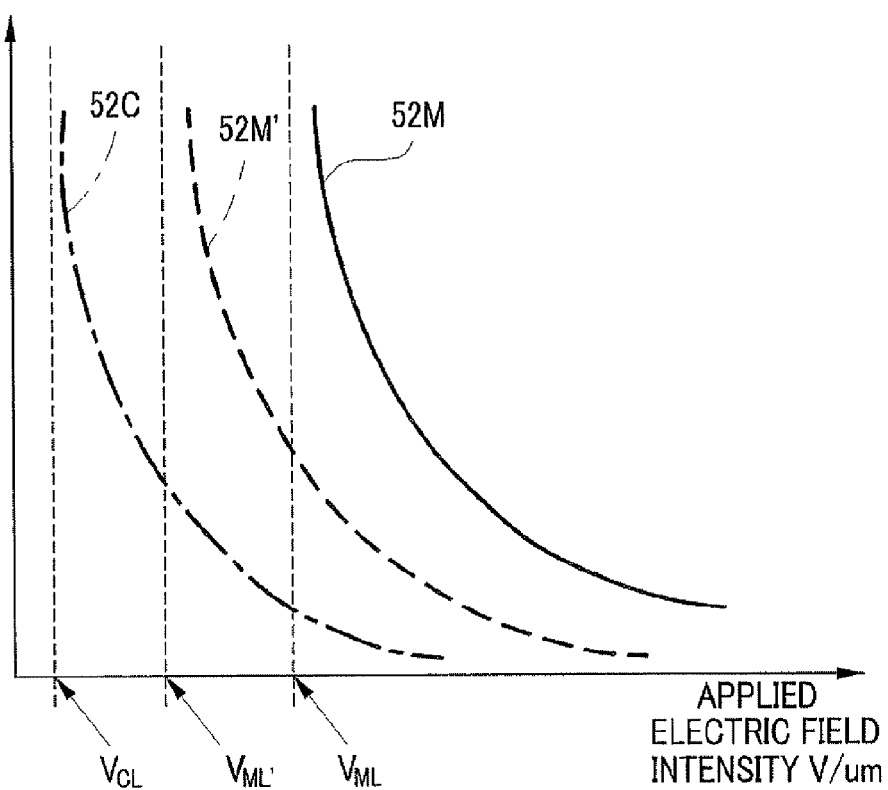
FIG. 3 is a diagram illustrating the relationship between an electric field intensity and a driving time.

Here, the relationship between the electric field intensity and the particle driving time (the particle migrating time) is the same as shown in FIG. 3. In FIG. 3, the characteristic indicating the relationship between the electric field intensity and the driving time of the particles of the magenta particles M is represented by the characteristic 52M and the characteristic indicating the relationship between the electric field intensity and the driving time of the cyan particles C is represented by the characteristic 52C. As shown in FIG. 3, as the electric field intensity applied across the substrates increases, the driving time decreases. As the particles have the smaller threshold electric field intensity, the driving time becomes shorter.

Figure 4:
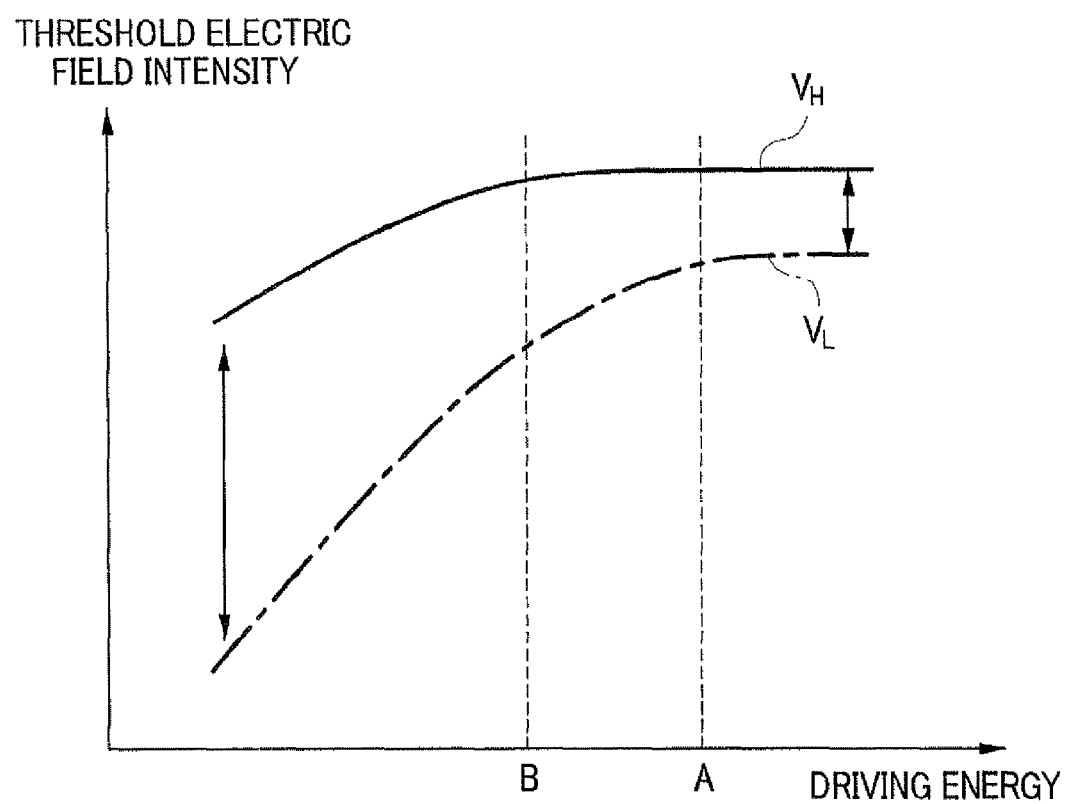
FIG. 4 is a diagram illustrating the relationship between a driving energy and a threshold electric field intensity.

As shown in FIG. 4, when the absolute value of the electric field intensity with which particles start the migration from one substrate to the other substrate is $V_L$ and the absolute value of the electric field intensity with which all the particles end the migration from one substrate to the other substrate is $V_H$, the threshold electric field intensity varies due to the driving energy for causing particles to migrate. As the driving energy decreases, the threshold electric field intensity also decreases. For example, it is assumed that the threshold characteristic of magenta particles M is a threshold characteristic when the driving energy is A as shown in FIG. 4 and is the threshold characteristic 50M shown in FIG. 2. For example, when the driving energy is set to the driving energy B shown in FIG. 4 by fixing the voltage value and shortening the voltage application time, the driving energy B is smaller than the driving energy A and thus the threshold characteristic is shifted from the threshold characteristic 50M to the threshold characteristic 50W as shown in FIG. 2. As shown in FIG. 3, the characteristic indicating the relationship between the electric field intensity of the magenta particles M and the driving time of the particles is the same as the characteristic 52M'. The driving energy of one type of particles varies with the variation in driving energy of the other type of particles. For example, when the driving energy causing the magenta particles M to migrate decreases, the driving energy causing the cyan particles C to migrate also decreases like a chain reaction.

Figure 5:
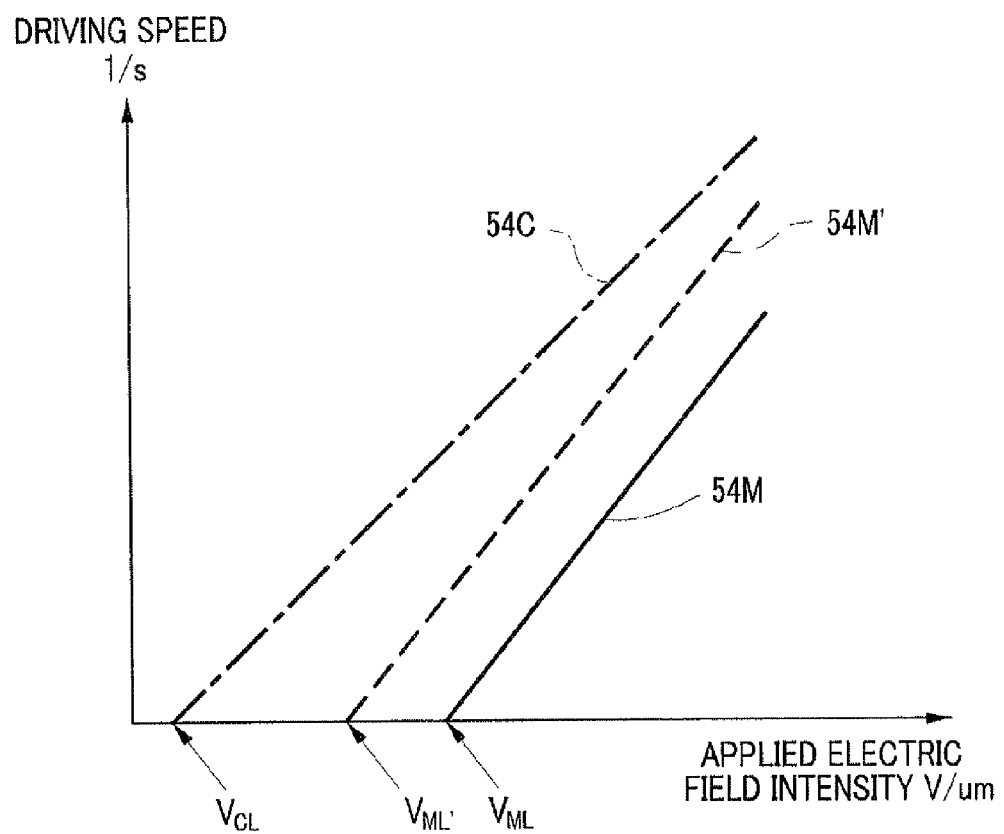
FIG. 5 is a diagram illustrating the relationship between an electric field intensity and a driving speed.

FIG. 5 illustrates the relationship between the electric field intensity and the driving speed of each type of particles. In the drawing, the characteristic of the magenta particles M is represented by 54M, the characteristic when the threshold characteristic of the magenta particles M is shifted is represented by 54M', and the characteristic of the cyan particles C is represented by 54C. As shown in the drawing, the driving speed of the cyan particles C having a smaller threshold electric field intensity is higher than that of the magenta particles M.

In the example shown in FIG. 2, even when the threshold characteristic of the magenta particles M is shifted to the characteristic 50M', the electric field intensity $V_{CH}$ with which the cyan particles C end the migration to the rear substrate 2 is smaller than the electric field intensity $V_{ML'}$ with which the magenta particles M start the migration from the rear substrate 2 to the display substrate 1, whereby a mixed color is not generated and the driving time is shortened.

Figure 6:
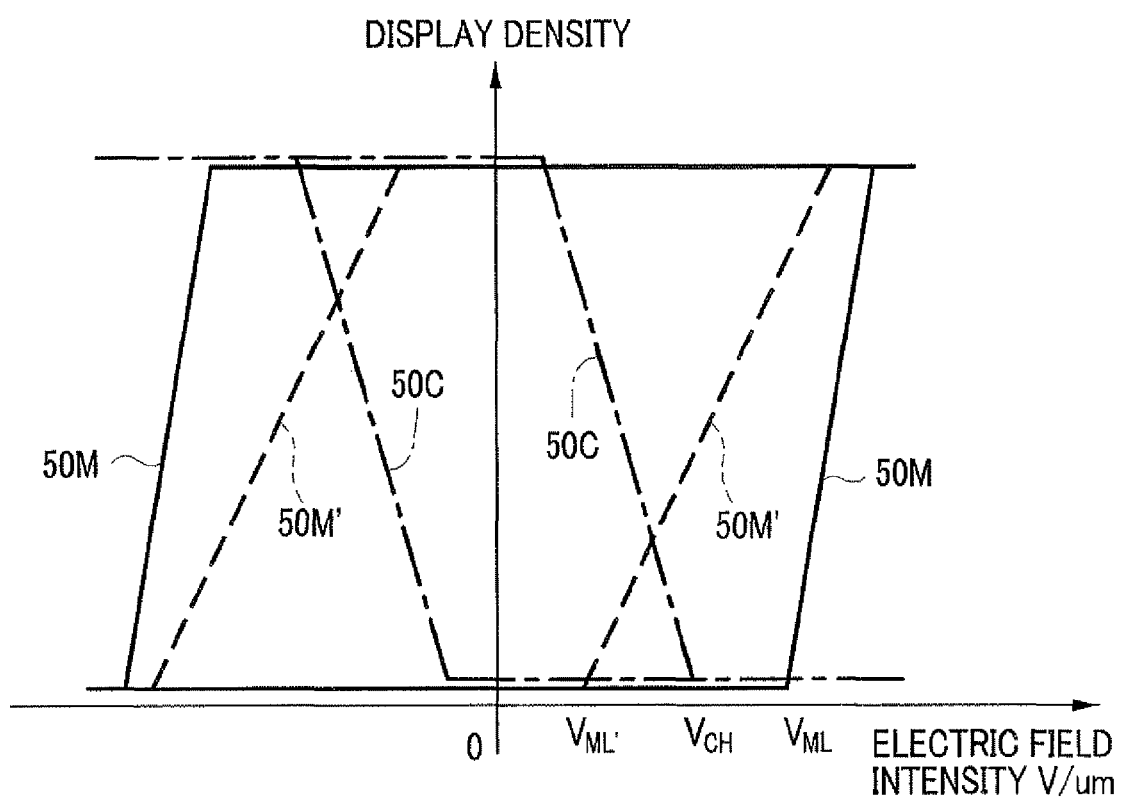
FIG. 6 is a diagram illustrating threshold characteristics of migration particles.

On the contrary, as shown in FIG. 6, when the threshold characteristic 50M' crosses the threshold characteristic 50C of the cyan particles C, that is, when the threshold electric field intensity $V_{ML'}$ of the magenta particles M is smaller than the threshold electric field intensity $V_{CH}$ of the cyan particles C, and for example, when the threshold electric field intensity $V_{CH}$ is applied across the substrates so as to drive the cyan particles C, the magenta particles M may also migrate to cause a mixed color. The magenta particles M may be driven under such conditions that a mixed color is not caused depending on the display density of the cyan particles C.

In this exemplary embodiment, the driving conditions of the magenta particles M are set so that the driving time is shortened in a range where a mixed color is not caused.

First, a basic driving procedure when the color of the particles is displayed in gray scales, that is, when the color density of the particles is adjusted will be described.

When a color is displayed in gray scales, the driving procedure basically includes a first stroke in which all the particles migrate to one substrate and a second stroke in which particles migrate from one substrate to the other substrate depending on the gray scale.

Figure 7A:
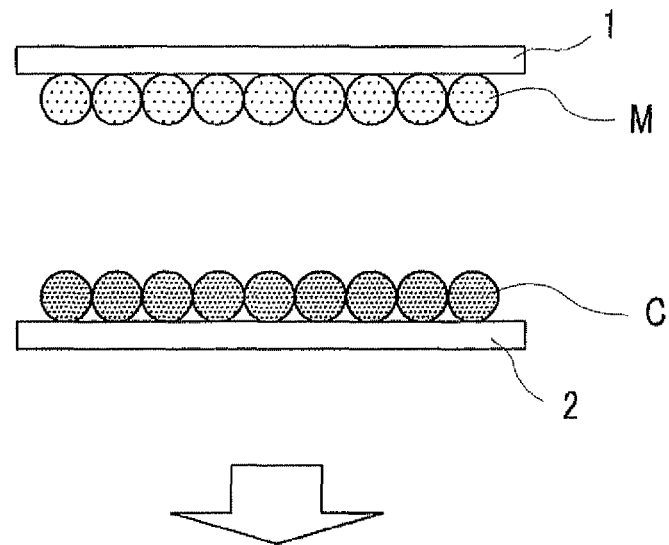
FIGS. 7A to 7C are diagrams illustrating migrating conditions of migration particles.

Specifically, for example, as shown in FIG. 7A, by applying a voltage causing all the magenta particles M to migrate to the display substrate 1 to the display electrode 3, all the magenta particles M are caused to migrate to the display substrate 1 and all the cyan particles C are caused to migrate to the rear substrate 2 (the first stroke of the magenta particles M).

Figure 7B:
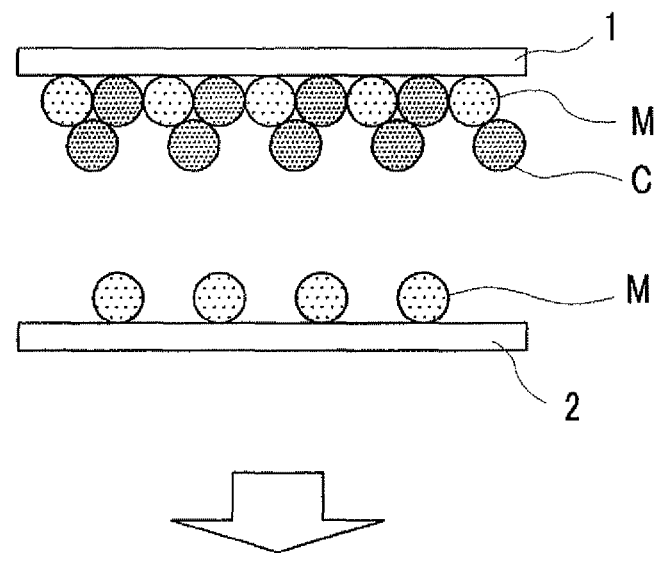

As shown in FIG. 7B, a voltage causing the magenta particles M corresponding to the gray scale to remain on the display substrate 1 side and causing the other magenta particles M to migrate to the rear substrate 2 is applied to the display electrode 3. Accordingly, the magenta particles M corresponding to the gray scale remain on the display substrate 1 side, the other magenta particles M migrate to the rear substrate 2, and all the cyan particles C migrate to the display substrate 1 (the second stroke of the magenta particles M and the first stroke of the cyan particles C).

Figure 7C:
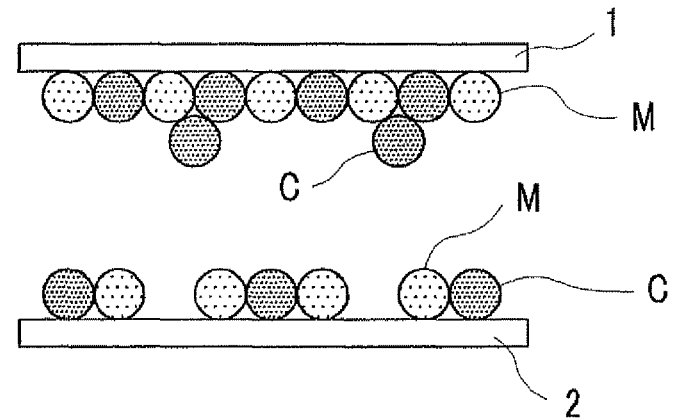

As shown in FIG. 7C, a voltage causing the cyan particles C corresponding to the gray scale to remain on the display substrate 1, causing the other cyan particles C to migrate to the rear substrate 2, and not causing the magenta particles M to migrate is applied to the display electrode 3. Accordingly, the cyan particles C corresponding to the gray scale remain in the display substrate 1 side and the other magenta particles M migrate to the rear substrate 2 (the second stroke of the cyan particles C).

Figure 8A:
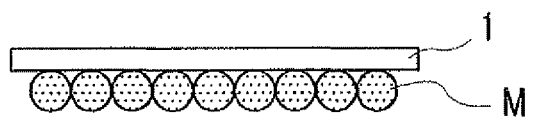
FIGS. 8A to 8D are diagrams illustrating migrating conditions of migration particles.
Figure 8A:
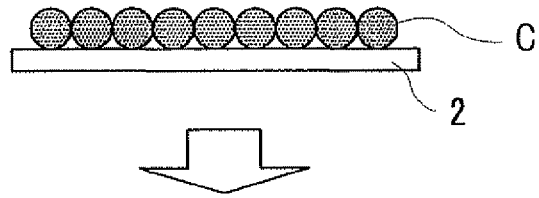
Figure 8B:
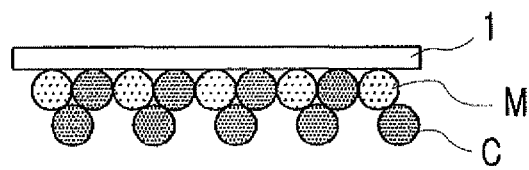
Figure 8B:
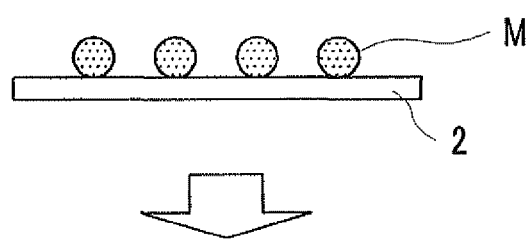
Figure 8C:
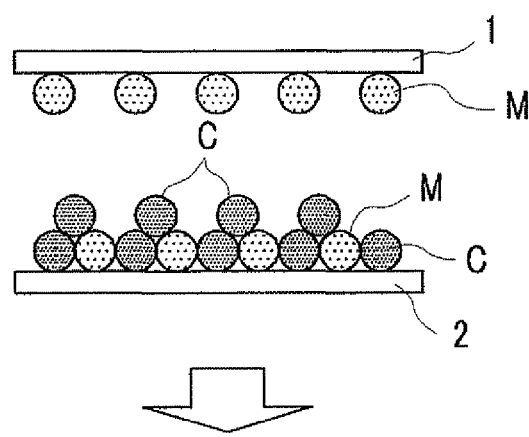
Figure 8D:
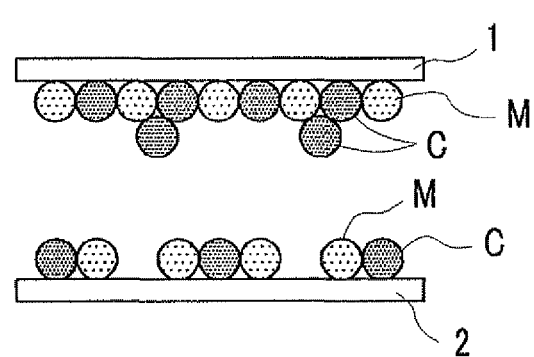

The particles may be driven in the procedure shown in FIGS. 8A to 8D. Specifically, as shown in FIG. 8A, the particles may be driven in the same way as shown in FIG. 7A (the first stroke of the magenta particles M). Then, as shown in FIG. 8B, the particles may be driven in the same way as shown in FIG. 7B (the second stroke of the magenta particles M). Then, as shown in FIG. 8C, a voltage causing all the cyan particles C to migrate to the rear substrate 2 and not causing the magenta particles M to migrate may be applied to the display electrode 3 (the first stroke of the cyan particles C). Subsequently, as shown in FIG. 8D, a voltage causing the cyan particles C corresponding to the gray scale to migrate to the display substrate 1 and not causing the magenta particles M to migrate may be applied to the display electrode 3 (the second stroke of the cyan particles C).

The procedures shown in FIGS. 7 and 8 are only examples and the invention is not limited to the examples. For example, all the magenta particles M may be first caused to migrate to the rear substrate 2, all the cyan particles C may be caused to migrate to the display substrate 1, the magenta particles M corresponding to the gray scale may be caused to migrate to the display substrate 1, all the cyan particles C may be caused to migrate to the rear substrate 2, and then the cyan particles C corresponding to the gray scale may be caused to migrate to the display substrate 1.

The specific driving procedure will be described below.

Figure 9:
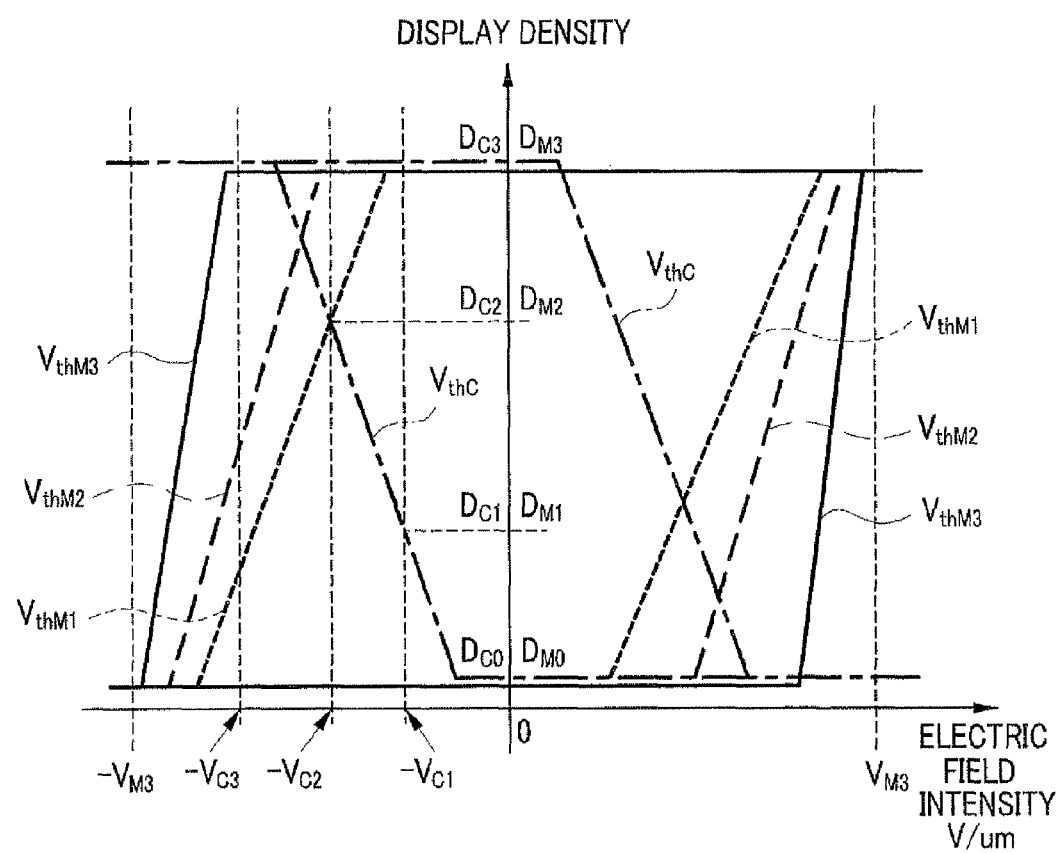
FIG. 9 is a diagram illustrating threshold characteristics of migration particles.

FIG. 9 shows the threshold characteristics which are changed by fixing the voltage value of a voltage, which is applied at the time of causing the magenta particles M to migrate, and changing the voltage application time.

In FIG. 9, the threshold characteristics of the magenta particles M are represented by $V_{thM3}$, $V_{thM2}$, and $V_{thM1}$ and the threshold characteristic of the cyan particles C is represented by $V_{thC}$. The voltage value of a voltage applied to the display electrode 3 in the first stroke of the magenta particles M when the display density of the magenta particles M is set to $D_{M3}$ (the highest density) is represented by $-V_{M3}$, the voltage value of a voltage applied to the display electrode 3 in the second stroke of the magenta particles M (the first stroke of the cyan particles C) is represented by $V_{M3}$, the voltage value of a voltage applied to the display electrode 3 when the display density of the cyan particles C is set to $D_{C3}$ (the highest density) in the second stroke of the cyan particles C is represented by $-V_{C3}$, the voltage value of a voltage applied to the display electrode 3 when the display density of the cyan particles C is set to $D_{C2}$ is represented by $-V_{C2}$, and the voltage value of a voltage applied to the display electrode 3 when the display density of the cyan particles C is set to $D_{C1}$ is represented by $-V_{C1}$.

Figure 10:
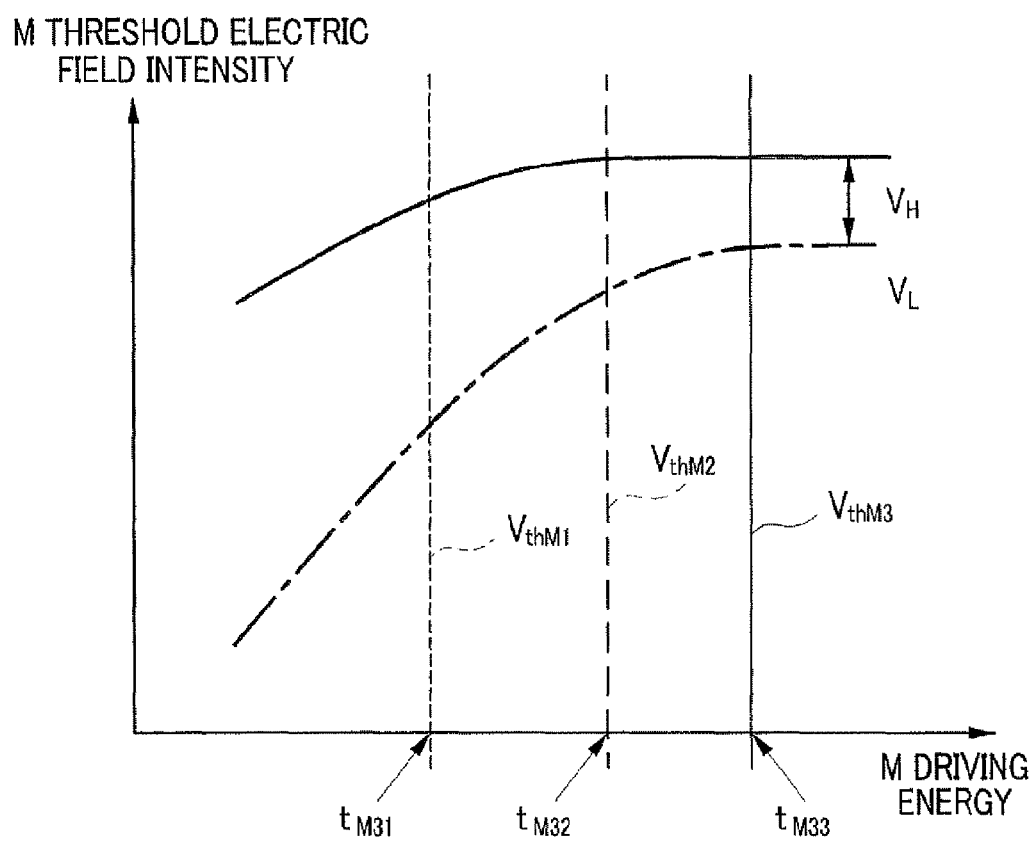
FIG. 10 is a diagram illustrating the relationship between a driving energy and a threshold electric field intensity.

FIG. 10 shows the relationship between the threshold characteristics $V_{thM3}$, $V_{thM2}$, and $V_{thM1}$ and the driving energy of the magenta particles M. Here, the driving energy means a voltage application time when a voltage of the voltage value $V_{M3}$ is applied to the display electrode 3. As shown in FIG. 10, the threshold characteristic $V_{thM3}$ is a threshold characteristic when a voltage of the voltage value $V_{M3}$ and the voltage application time $t_{M33}$ is applied to the display electrode 3. The threshold characteristic $V_{thM2}$ is a threshold characteristic when a voltage of the voltage value $V_{M3}$ and the voltage application time $t_{M32}$ is applied to the display electrode 3. The threshold characteristic $V_{thM1}$ is a threshold characteristic when a voltage of the voltage value $V_{M3}$ and the voltage application time $t_{M31}$ is applied to the display electrode 3. As shown in FIG. 10, the following conditional expression is satisfied: $t_{M33} > t_{M32} > t_{M31}$.

FIG. 11 shows the relationship between the threshold characteristics and the density of the cyan particles C when the density of the magenta particles M is set to $D_{M3}$. As shown in FIG. 9, the threshold characteristic $V_{thC}$ of the cyan particles C crosses the threshold characteristics $V_{thM2}$ and $V_{thM1}$ of the magenta particles M. Accordingly, when the density of the cyan particles C is equal to or greater than $D_{C2}$ and $V_{thM2}$ and $V_{thM1}$ are used as the threshold characteristics of the magenta particles M, a mixed color may be generated as shown in FIG. 11.

On the other hand, when a mixed color is not generated, it is preferable that the driving time, that is, the voltage application time, is as short as possible. Accordingly, as shown in FIG. 11, when the density of the cyan particles C is set to $D_{C0}$ or $D_{C1}$, $V_{thM1}$ with which the mixed color is not generated and the voltage application time is shortened is selected as the threshold characteristic of the magenta particles M and the voltage application time is set to $t_{M31}$.

When the density of the cyan particles C is set to $D_{C2}$, $V_{thM2}$ with which the mixed color is not generated and the voltage application time is most shortened is selected as the threshold characteristic of the magenta particles M and the voltage application time is set to $t_{M32}$.

When the density of the cyan particles C is set to $D_{C3}$, $V_{thM3}$ is selected as the threshold characteristic of the magenta particles M and the voltage application time is set to $t_{M33}$.

Specifically, table data indicating the relationship between the density of the cyan particles C and the voltage application time which is the shortest at the time of driving the magenta particles M in the second stroke without generating a mixed color may be stored in the nonvolatile memory 40D in advance for each density of the magenta particles M, the voltage application time corresponding to the density of the cyan particles C may be read from the table data corresponding to the density of the magenta particles M, and the read voltage application time may be instructed to the voltage application unit 30.

Figure 12A:
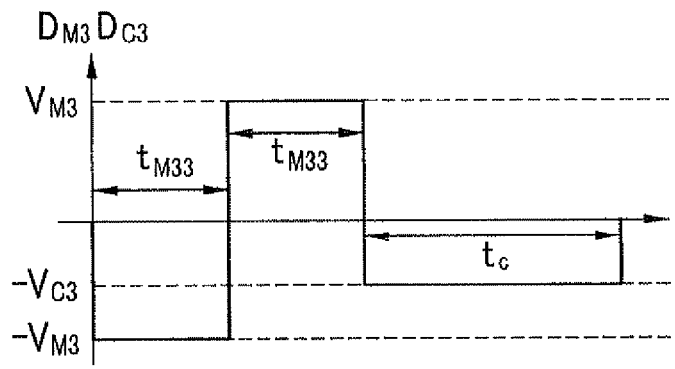
FIGS. 12A to 12C are diagrams illustrating an order in which a voltage is applied.
Figure 12B:
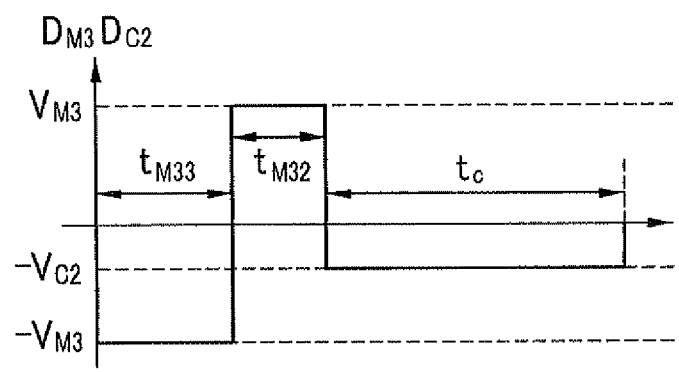
Figure 12C:
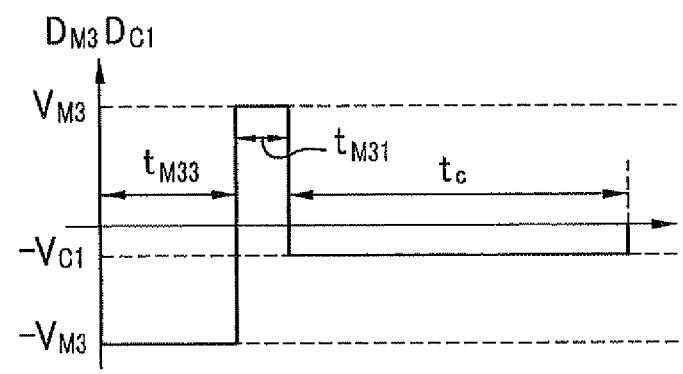

FIGS. 12A to 12C show a specific voltage applying procedure.

As shown in FIG. 12A, when the density of the magenta particles M is set to $D_{M3}$ and the density of the cyan particles C is set to $D_{C3}$, a voltage of the voltage value $-V_{M3}$ and the voltage application time $t_{M33}$ is first applied to the display electrode 3 as the first stroke of the magenta particles M. Accordingly, all the magenta particles M migrate to the rear substrate 2 and all the cyan particles C migrate to the display substrate 1.

A voltage of the voltage value $+V_{M3}$ and the voltage application time $t_{M33}$ is applied to the display electrode 3 as the second stroke of the magenta particles M and the first stroke of the cyan particles C. Accordingly, the magenta particles M corresponding to the density $D_{M3}$, that is, all the magenta particles M, migrate to the display substrate 1 and all the cyan particles C migrate to the rear substrate 2.

A voltage of the voltage value $-V_{C3}$ and the voltage application time $t_C$ corresponding to the density $D_{C3}$ of the cyan particles C is applied to the display electrode 3 as the second stroke of the cyan particles C. Accordingly, the cyan particles C corresponding to the density $D_{C3}$, that is, all the cyan particles C, migrate to the display substrate 1.

As shown in FIG. 12B, when the density of the magenta particles M is set to $D_{M3}$ and the density of the cyan particles C is set to $D_{C2}$, a voltage of the voltage value $-V_{M3}$ and the voltage application time $t_{M33}$ is first applied to the display electrode 3 as the first stroke of the magenta particles M. Accordingly, all the magenta particles M migrate to the rear substrate 2 and all the cyan particles C migrate to the display substrate 1.

A voltage of the voltage value $+V_{M3}$ and the voltage application time $t_{M32}$ is applied to the display electrode 3 as the second stroke of the magenta particles M and the first stroke of the cyan particles C. Accordingly, the magenta particles M corresponding to the density $D_{M3}$, that is, all the magenta particles M, migrate to the display substrate 1 and all the cyan particles C migrate to the rear substrate 2.

A voltage of the voltage value $-V_{C2}$ and the voltage application time $t_C$ corresponding to the density $D_{C2}$ of the cyan particles C is applied to the display electrode 3 as the second stroke of the cyan particles C. Accordingly, the cyan particles C corresponding to the density $D_{C2}$ migrate to the display substrate 1.

As shown in FIG. 12C, when the density of the magenta particles M is set to $D_{M3}$ and the density of the cyan particles C is set to $D_{C1}$, a voltage of the voltage value $-V_{M3}$ and the voltage application time $t_{M33}$ is first applied to the display electrode 3 as the first stroke of the magenta particles M. Accordingly, all the magenta particles M migrate to the rear substrate 2 and all the cyan particles C migrate to the display substrate 1.

A voltage of the voltage value $+V_{M3}$ and the voltage application time $t_{M31}$ is applied to the display electrode 3 as the second stroke of the magenta particles M and the first stroke of the cyan particles C. Accordingly, the magenta particles M corresponding to the density $D_{M3}$, that is, all the magenta particles M, migrate to the display substrate 1 and all the cyan particles C migrate to the rear substrate 2.

A voltage of the voltage value $-V_{C1}$ and the voltage application time $t_C$ corresponding to the density $D_{C1}$ of the cyan particles C is applied to the display electrode 3 as the second stroke of the cyan particles C. Accordingly, the cyan particles C corresponding to the density $D_{C1}$ migrate to the display substrate 1.

An example where the density of the magenta particles M is set to $D_{M1}$ will be described below.

Figure 13:
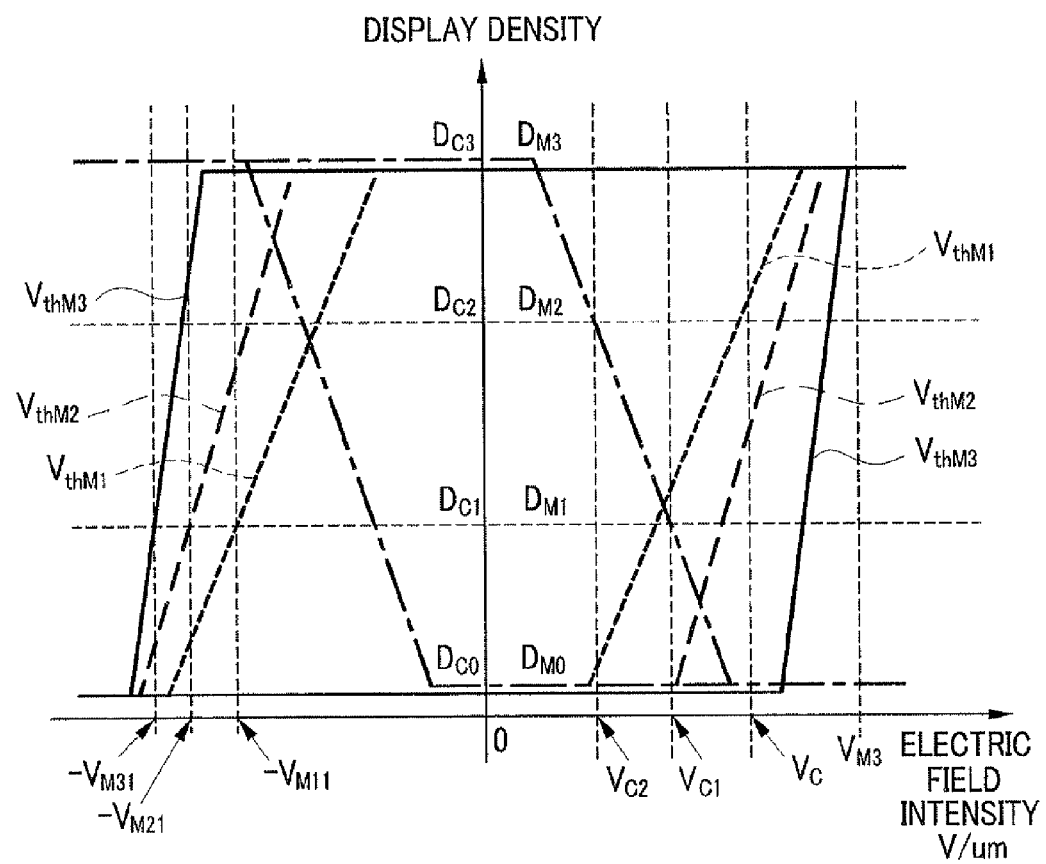
FIG. 13 is a diagram illustrating threshold characteristics of migration particles.

FIG. 13 shows the threshold characteristics of the magenta particles M and the cyan particles C. The threshold characteristics of the particles are the same as shown in FIG. 9. In FIG. 13, the voltage value of the voltage applied to the display electrode 3 in the first stroke of the magenta particles M is represented by $+V_{M3}$, the voltage values of the voltage applied to the display electrode 3 in the second stroke of the magenta particles M (the first stroke of the cyan particles C) are represented by $-V_{M31}$, $-V_{M21}$, and $-V_{M11}$, the voltage value of the voltage applied to the display electrode 3 when the display density of the cyan particles C is set to $D_{C0}$ (the lowest density) in the second stroke of the cyan particles C is represented by $+V_C$, the voltage value of the voltage applied to the display electrode 3 when the display density of the cyan particles C is set to $D_{C1}$ is represented by $+V_{C1}$, and the voltage value of the voltage applied to the display electrode 3 when the display density of the cyan particles C is set to $D_{C2}$ is represented by $+V_{C2}$.

FIG. 14 shows the relationship between the threshold characteristics and the density of the cyan particles C when the density of the magenta particles M is set to $D_{M1}$. As shown in FIG. 13, the threshold characteristic $V_{thC}$ of the cyan particles C crosses the threshold characteristics $V_{thM2}$ and $V_{thM1}$ of the magenta particles M. Accordingly, when the density of the cyan particles C is equal to or less than $D_{C1}$ and $V_{thM2}$ and $V_{thM1}$ are used as the threshold characteristics of the magenta particles M, a mixed color may be generated as shown in FIG. 14.

On the other hand, when a mixed color is not generated, it is preferable that the driving time, that is, the voltage application time, is as short as possible. Accordingly, as shown in FIG. 14, when the density of the cyan particles C is set to $D_{C2}$ or $D_{C3}$, $V_{thM1}$ with which the mixed color is not generated and the voltage application time is shortened is selected as the threshold characteristic of the magenta particles M and the voltage application time is set to $t_{M31}$.

When the density of the cyan particles C is set to $D_{C1}$, $V_{thM2}$ with which the mixed color is not generated and the voltage application time is most shortened is selected as the threshold characteristic of the magenta particles M and the voltage application time is set to $t_{M32}$.

When the density of the cyan particles C is set to $D_{C0}$, $V_{thM3}$ is selected as the threshold characteristic of the magenta particles M and the voltage application time is set to $t_{M33}$.

Figure 15:
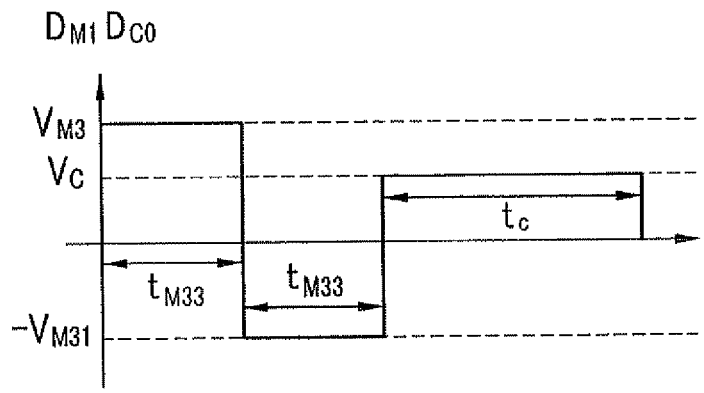
FIG. 15 is a diagram illustrating an order in which a voltage is applied.

FIG. 15 shows a specific voltage applying procedure when the density of the magenta particles M is set to $D_{M1}$ and the density of the cyan particles C is set to $D_{C0}$.

As shown in FIG. 15, when the density of the magenta particles M is set to $D_{M1}$ and the density of the cyan particles C is set to $D_{C0}$, a voltage of the voltage value $+V_{M3}$ and the voltage application time $t_{M33}$ is first applied to the display electrode 3 as the first stroke of the magenta particles M. Accordingly, all the magenta particles M migrate to the display substrate 1 and all the cyan particles C migrate to the rear substrate 2.

A voltage of the voltage value $-V_{M31}$ and the voltage application time $t_{M33}$ is applied to the display electrode 3 as the second stroke of the magenta particles M and the first stroke of the cyan particles C. Accordingly, the magenta particles M corresponding to the density $D_{M1}$ remain on the display substrate 1 side, the other magenta particles M migrate to the rear substrate 2, and all the cyan particles C migrate to the display substrate 1.

A voltage of the voltage value $+V_C$ and the voltage application time $t_C$ corresponding to the density $D_{C0}$ of the cyan particles C is applied to the display electrode 3 as the second stroke of the cyan particles C. Accordingly, all the cyan particles C migrate to the display substrate 1.

Figure 16A:
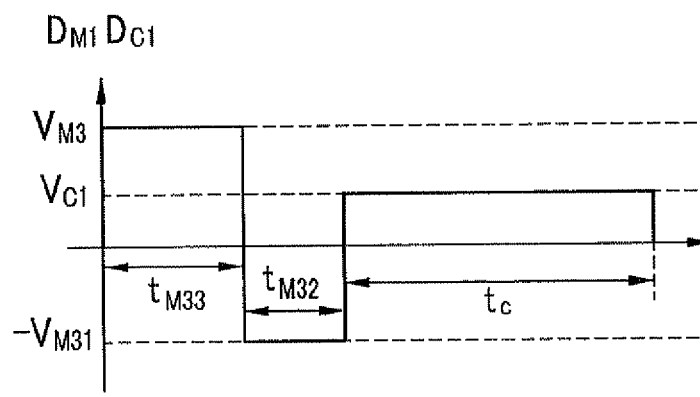
FIGS. 16A and 16B are diagrams illustrating an order in which a voltage is applied.

As shown in FIG. 16A, when the density of the magenta particles M is set to $D_{M1}$ and the density of the cyan particles C is set to $D_{C1}$, a voltage of the voltage value $+V_{M3}$ and the voltage application time $t_{M33}$ is first applied to the display electrode 3 as the first stroke of the magenta particles M. Accordingly, all the magenta particles M migrate to the display substrate 1 and all the cyan particles C migrate to the rear substrate 2.

A voltage of the voltage value $-V_{M31}$ and the voltage application time $t_{M32}$ is applied to the display electrode 3 as the second stroke of the magenta particles M and the first stroke of the cyan particles C. Accordingly, the magenta particles M corresponding to the density $D_{M1}$ remain on the display substrate 1 side, the other magenta particles M migrate to the rear substrate 2, and all the cyan particles C migrate to the display substrate 1.

A voltage of the voltage value $+V_{C1}$ and the voltage application time $t_C$ corresponding to the density $D_{C1}$ of the cyan particles C is applied to the display electrode 3 as the second stroke of the cyan particles C. Accordingly, the cyan particles C corresponding to the density $D_{C1}$ remain on the display substrate 1 side and the other cyan particles C migrate to the rear substrate 2.

Figure 17A:
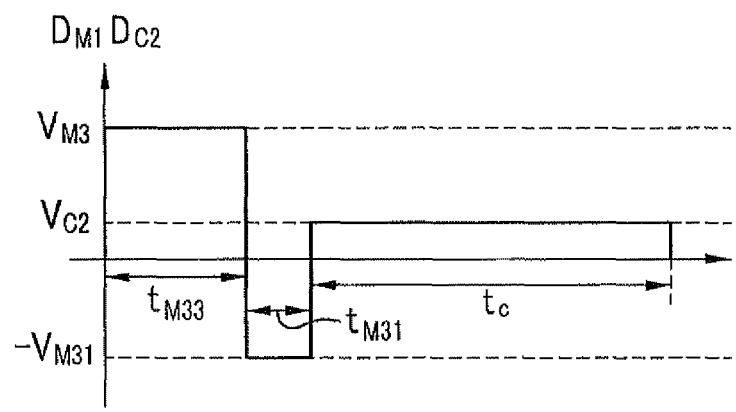
FIGS. 17A to 17C are diagrams illustrating an order in which a voltage is applied.

As shown in FIG. 17A, when the density of the magenta particles M is set to $D_{M1}$ and the density of the cyan particles C is set to $D_{C2}$, a voltage of the voltage value $+V_{M3}$ and the voltage application time $t_{M33}$ is first applied to the display electrode 3 as the first stroke of the magenta particles M. Accordingly, all the magenta particles M migrate to the display substrate 1 and all the cyan particles C migrate to the rear substrate 2.

A voltage of the voltage value $-V_{M31}$ and the voltage application time $t_{M31}$ is applied to the display electrode 3 as the second stroke of the magenta particles M and the first stroke of the cyan particles C. Accordingly, the magenta particles M corresponding to the density $D_{M1}$ remain on the display substrate 1 side, the other magenta particles M migrate to the rear substrate 2, and all the cyan particles C migrate to the display substrate 1.

A voltage of the voltage value $+V_{C2}$ and the voltage application time $t_C$ corresponding to the density $D_{C2}$ of the cyan particles C is applied to the display electrode 3 as the second stroke of the cyan particles C. Accordingly, the cyan particles C corresponding to the density $D_{C2}$ remain on the display substrate 1 side and the other cyan particles C migrate to the rear substrate 2.

Figure 16B:
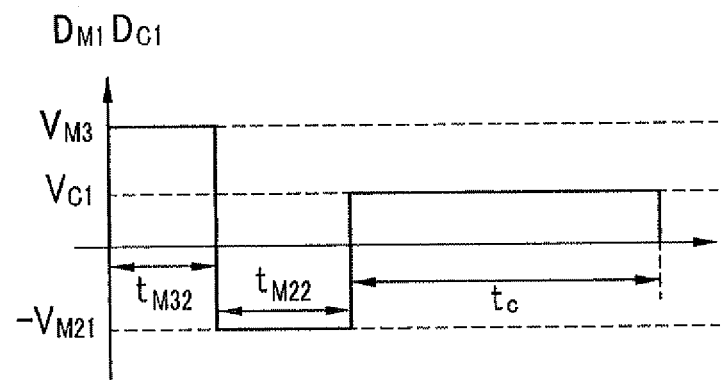

When the density of the cyan particles C is $D_{C1}$ and $V_{thM2}$ is selected as the threshold characteristic of the magenta particles M, a mixed color is not generated. Accordingly, as shown in FIG. 16B, a voltage of the voltage value $+V_{M3}$ and the voltage application time $t_{M32}$ may be applied to the display electrode 3 as the first stroke of the magenta particles M. A voltage of the voltage value $-V_{M21}$ ($|V_{M21}|<|V_{M31}|$) and the voltage application time $t_{M22}$ ($>t_{M32}$) may be applied to the display electrode 3 as the second stroke of the magenta particles M.

Figure 17B:
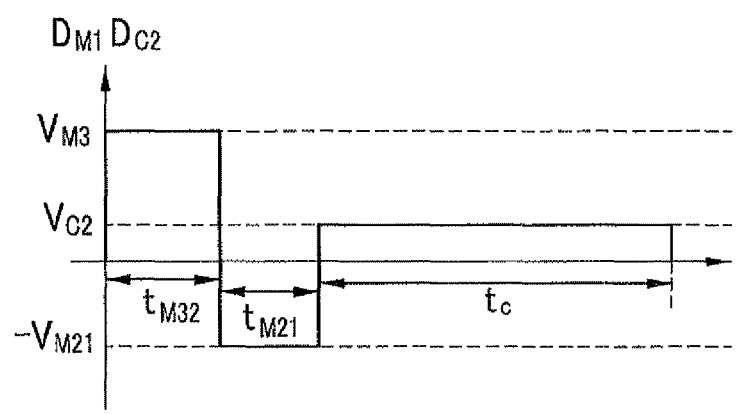

When the density of the cyan particles C is $D_{C2}$ and $V_{thM2}$ is selected as the threshold characteristic of the magenta particles M, a mixed color is not generated. Accordingly, as shown in FIG. 17B, a voltage of the voltage value $+V_{M3}$ and the voltage application time $t_{M32}$ may be applied to the display electrode 3 as the first stroke of the magenta particles M. A voltage of the voltage value $-V_{M21}$ ($|V_{M21}|<|V_{M31}|$) and the voltage application time $t_{M21}$ ($>t_{M31}$) may be applied to the display electrode 3 as the second stroke of the magenta particles M.

Figure 17C:
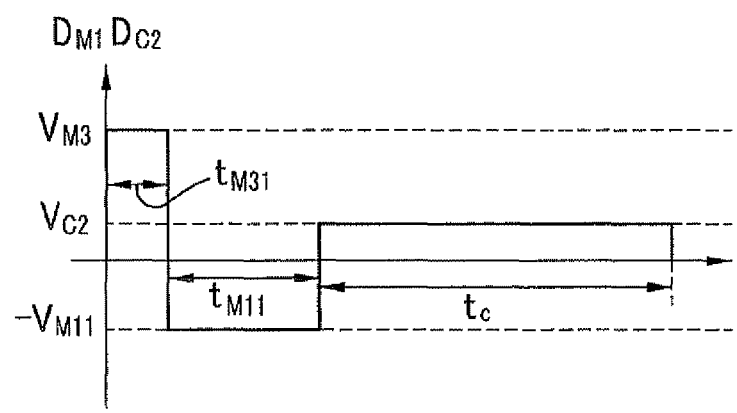

When the density of the cyan particles C is $D_C$ and $V_{thM1}$ is selected as the threshold characteristic of the magenta particles M, a mixed color is not generated. Accordingly, as shown in FIG. 17C, a voltage of the voltage value $+V_{M3}$ and the voltage application time $t_{M31}$ may be applied to the display electrode 3 as the first stroke of the magenta particles M.

A voltage of the voltage value $-V_{M11}(|V_{M11}|<|V_{M21}|)$ and the voltage application time $t_{M11}$ ($>t_{M21}$) may be applied to the display electrode 3 as the second stroke of the magenta particles M.

Figure 18:
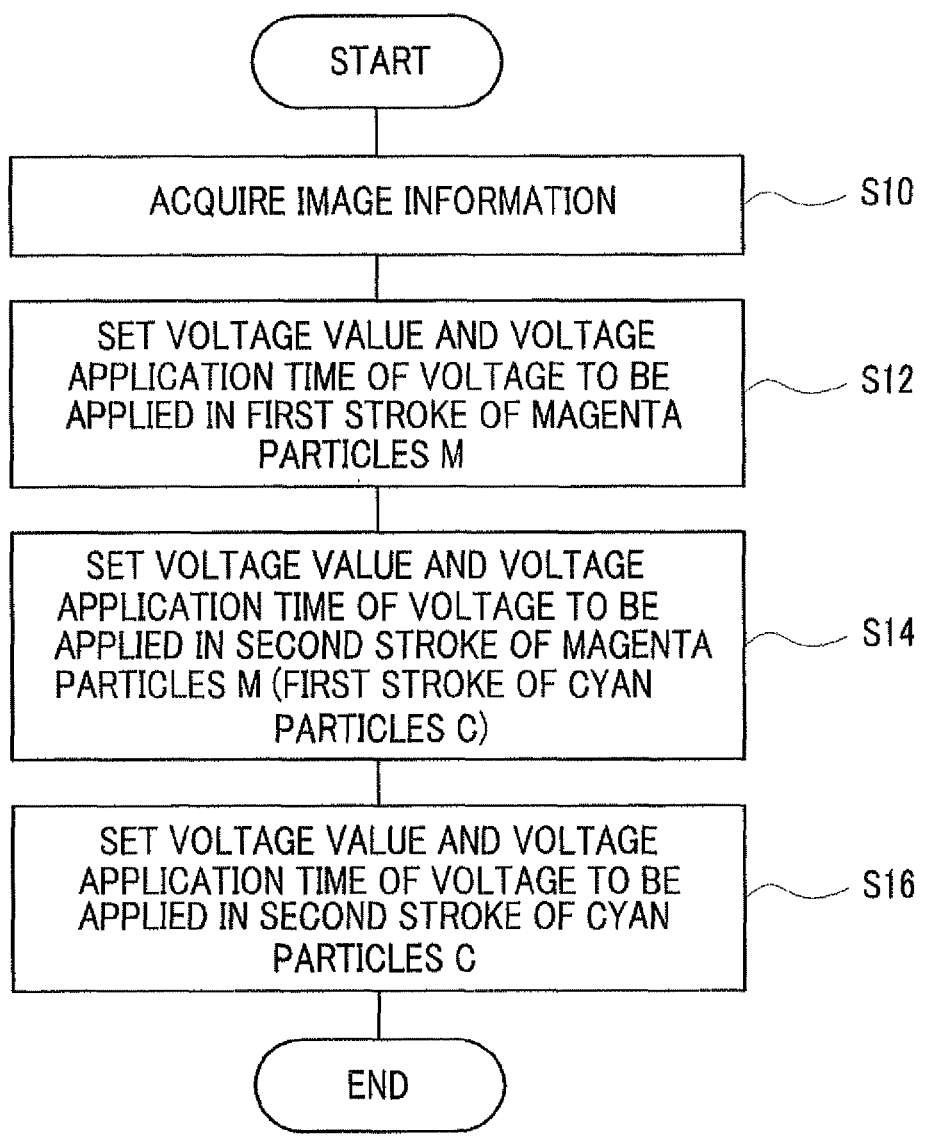
FIG. 18 is a flowchart illustrating the flow of processes performed by a control unit.

The control performed by the CPU 40A of the control unit 40 will be described below with reference to the flowchart shown in FIG. 18.

First, in step S10, image information of an image to be displayed on the display medium 100 is acquired from an external device not shown, for example, via the I/O 40E.

In step S12, the voltage value and the voltage application time of the voltage applied in the first stroke of the magenta particles M are set in the voltage application unit 30. For example, when the density of the magenta particles M is $D_{M3}$ and the density of the cyan particles C is $D_{C3}$, $-V_{M3}$ is set as a predetermined voltage value and $t_{M33}$ is set as a predetermined voltage application time, as shown in FIG. 12A.

In step S14, the voltage value and the voltage application time of the voltage applied in the second stroke of the magenta particles M (the second stroke of the cyan particles C) are set in the voltage application unit 30. Specifically, the table data corresponding to the density of the magenta particles M, that is, the table data indicating the relationship between the density of the cyan particles C and the voltage application time which is the shortest at the time of driving the magenta particles M in the second stroke without generating a mixed color, is read from the nonvolatile memory 40D. The voltage application time at the time of driving the magenta particles M in the second stroke corresponding to the density of the cyan particles C is set on the basis of the read table data.

For example, as shown in FIG. 12A, when the density of the magenta particles M is $D_{M3}$ and the density of the cyan particles C is $D_{C3}$, the table data corresponding to the density $D_{M3}$ of the magenta particles M, the voltage application time $t_{M33}$ corresponding to the density $D_{C3}$ of the cyan particles C is read from the table data, and the read data is set in the voltage application unit 30. Regarding the voltage value, $+V_{M3}$ is set as the predetermined voltage value, as shown in FIG. 12A.

In step S16, the voltage value and the voltage application time of the voltage applied in the second stroke of the cyan particles C is set in the voltage application unit 30. Specifically, for example, as shown in FIG. 12A, when the density of the magenta particles M is $D_{M3}$ and the density of the cyan particles C is $D_{C3}$, the predetermined voltage value $V_{C3}$ and the predetermined voltage application time $t_C$ corresponding to the density $D_{C3}$ of the cyan particles C are set in the voltage application unit 30.

In this exemplary embodiment, it has been stated that the threshold characteristic of the magenta particles M is changed by fixing the voltage value and changing the voltage application time. However, the threshold characteristic of the magenta particles M may be changed by fixing the voltage application time and changing the voltage value.

In this exemplary embodiment, it has been stated that the particle groups include two groups of the magenta particles M and the cyan particles C. However, the number of types of particles may be three or more. For example, the invention can be applied to the case where the particle groups include three types of magenta particles M, cyan particles C, and yellow particles Y.

EXAMPLES

Examples of the invention will be described below.
Production of Non-Charged White Particles 5 part by mass of 2-vinyl naphthalene (made by Nippon Steel Chemical Co., Ltd.), 5 part by mass of Silaplane FM-0721 (made by Chisso Corporation), 0.3 part by mass of lauroyl peroxide as an initiator (made by Wako Pure Chemical Industries Ltd.), and 20 part by mass of silicone oil KF-96L-1CS (made by Shin-Etsu Chemical Co., Ltd.) are added to a 100 ml three-necked flask having a reflux condenser tube attached thereto, the resultant is subjected to a bubbling process using nitrogen gas for 15 minutes, and the resultant is then subjected to a polymerization process at 65° C. for 24 hours in the atmosphere of nitrogen, whereby white particles are produced.

The resultant white particles were refined by repeatedly performing a particle precipitation process using a centrifugal separator and a washing process using silicone oil. In this way, a dispersion liquid in which white particles are dispersed and of which the particle solid content is 40 mass % is produced. The volume average particle diameter (measured with FPAR-1000 made by Otsuka Electronics Co., Ltd.) of the produced white particles is 550 nm.
Production of Cyan Migration Particles C1, Positive Charging, Low Threshold 95 part by mass of Silaplane FM-0711 (made by Chisso Corporation), 3 part by mass of methyl methacrylate, and 2 part by mass of glycidyl methacrylate and are mixed with 50 part by mass of silicone oil (KF-96L-2CS made by Shin-Etsu Chemical Co., Ltd.), 0.5 part by mass of AIBN (2,2-azobis isobutyl nitrile) as a polymerization initiator is added thereto, and the resultant is polymerized, whereby reactive silicone-based polymer A (reactive dispersant) having an epoxy group is produced.

Then, copolymer of N-vinyl pyrrolidone and N,N-diethylaminoethylacrylate with a mass ratio of 9/1 is synthesized by the known radical solution polymerization.

Then, 3 part by mass of a 10 mass % aqueous solution of the copolymer is mixed with 1 part by mass of a water-dispersed pigment solution (Unisperse Cyan, pigment content of 26 mass %, made by Ciba Co.), the mixed solution is mixed with 10 part by mass of a 3 mass % silicone solution of reactive silicone-based polymer A, and the resultant is stirred by the use of an ultrasonic grinder for 10 minutes, whereby a suspension in which an aqueous solution containing polymer and pigment is dispersed and emulsified in silicone oil is produced.

The suspension is depressurized (2 KPa) and heated (70° C.) to remove moisture therefrom, whereby a silicone oil dispersion liquid in which colored particles containing polymer and pigment are dispersed in the silicone oil is obtained. The dispersion liquid is heated at 100° C. for 3 hours and is caused to react with the reactive silicone-based polymer and thus to be bonded thereto. Then, butylbromide corresponding to 50 mol % of N,N-diethylaminoethylacrylate in solid particles is added to the dispersion liquid, the resultant is heated at 80° C. for 3 hours and is subjected to an amino group quaternizing process, and the resultant is refined by repeatedly performing a particle precipitation process using a centrifugal separator and a washing process using silicone oil. In this way, a dispersion liquid in which colored particles containing cyan pigment are dispersed and of which the particle solid content is 4 mass % is produced.

The volume average particle diameter (measured with FPAR-1000 made by Otsuka Electronics Co., Ltd.) of the produced cyan particles is 680 nm.
Production of Magenta Migration Particles M1, Negative Charging, High Threshold 19 part by mass of Silaplane FM-0725 (made by Chisso Corporation), 29 part by mass of Silaplane FM-0721 (made by Chisso Corporation), 9 part by mass of methyl methacrylate (made by Wako Pure Chemical Industries Ltd.), 5 part by mass of octofluoropentyl methacrylate (made by Wako Pure Chemical Industries Ltd.), and 38 part by mass of hydroxyethyl methacrylate (made by Wako Pure Chemical Industries Ltd.) are mixed with 300 part by mass of isopropyl alcohol (IPA), 1 part by mass of AIBN (2,2-azobis isobutyl nitrile) as a polymerization initiator is melted therein, and the resultant is polymerized in the nitrogen atmosphere at 70° C. for 6 hours. The resultant product is refined using hexane as a re-precipitation solvent and then dried, whereby silicone-based polymer is obtained.

0.5 part by mass of silicone-based polymer B is added to and melted in 9 part by mass of isopropyl alcohol (IPA), 0.5 part by mass of magenta pigment (Pigment Red 3090) made by Sanyo Color Works Ltd. is added thereto, and the resultant is dispersed for 48 hours using zirconia balls with a diameter of 0.5 mm, whereby a pigment-containing polymer solution is obtained.

3 part by mass of the pigment-containing polymer solution is taken out and is heated at 40° C., and 12 part by mass of silicone oil (KF-96L-2CS made by Shin-Etsu Chemical Co., Ltd.) is dropped thereon little by little while applying ultrasonic waves thereto, whereby silicone-based polymer is extracted to the pigment surface. Thereafter, the resultant solution is heated at 60° C. and depressurized and dried to evaporate the IPA, whereby magenta particles in which silicone-based polymer is attached to the pigment surface are obtained.

The obtained magenta particles are refined by repeatedly performing a particle precipitation process using a centrifugal separator and a washing process using silicone oil. In this way, a dispersion liquid in which colored particles containing magenta pigment are dispersed and of which the particle solid content is 4 mass % is produced. The volume average particle diameter (measured with FPAR-1000 made by Otsuka Electronics Co., Ltd.) of the produced magenta particles is 380 nm.

Adjustment of Mixture Solution of CM2 Particle System

The white particle dispersion liquid, the cyan particle dispersion liquid, and the magenta particle dispersion liquid are mixed at the following ratio to produce a mixture solution of a CM2 particle system.

Mixture Ratio W:C:M=2:1:1 (wt %)

Manufacturing of Display Medium

ITO as an electrode is formed on a glass substrate of 50 mm×50 mm×1.1 mm as a surface substrate and a rear substrate with a thickness of 50 nm by the use of a sputtering method, and fluorine resin (CYTOP made by Asahi Glass Co., Ltd.) is formed thereon with a thickness of 100 nm by the use of a spin coating method.

A sheet obtained by cutting out a 20 mm×20 mm square from the central portion of a fluorine resin sheet of 50 mm×40 mm×50 μm is used as a spacer and is placed on the rear substrate.

The adjusted mixture solution of the CM2 particle system is injected into the square space formed at the central portion of the spacer. Thereafter, the surface substrate is brought into close contact with the spacer and both substrates are pressed and held with a double clip to bring the spacer into close contact with both substrates, whereby a display medium is manufactured.

Evaluation Method

Figure 19:
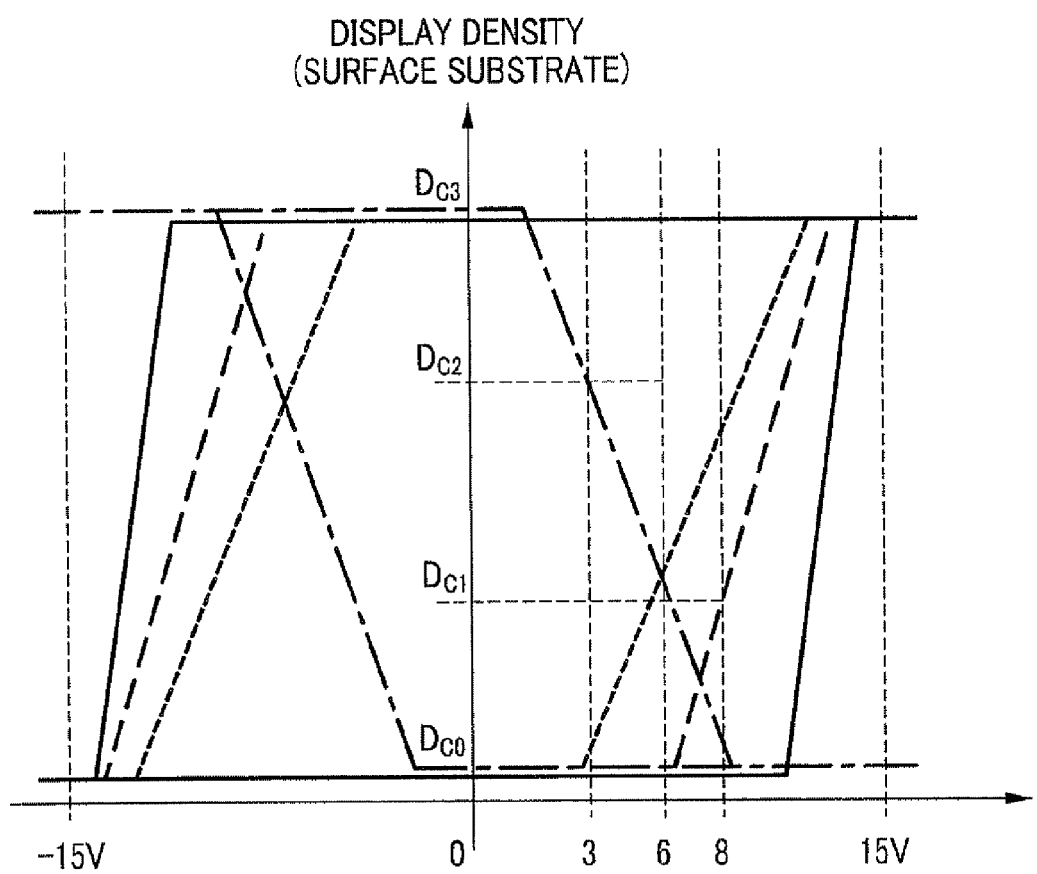
FIG. 19 is a diagram illustrating threshold characteristics of migration particles.

A voltage is applied across electrodes of the manufactured display medium, reflected light therefrom is measured with a spectroscope (USB2000+ made by Ocean Optics Inc.), and display characteristics are evaluated. The threshold characteristics of the manufactured display medium are shown in FIG. 19.

Evaluation Result of Driving

As the first stroke of the magenta particles which are high-threshold particles, 15 V is applied to the manufactured display medium for 1 second so as to set the display substrate as a positive electrode. At this time, the surface substrate is changed to magenta and the rear substrate is changed to cyan. A voltage is applied so as to set the display substrate as a negative electrode as the second stroke of the magenta particles which are high-threshold particles and the first stroke of cyan particles which are low-threshold particles, whereby the display substrate is changed to cyan and the rear substrate is changed to magenta. Subsequently, a voltage is applied so as to set the display substrate as a negative electrode as the second stroke of cyan particles which are low-threshold particles.

Figure 22:
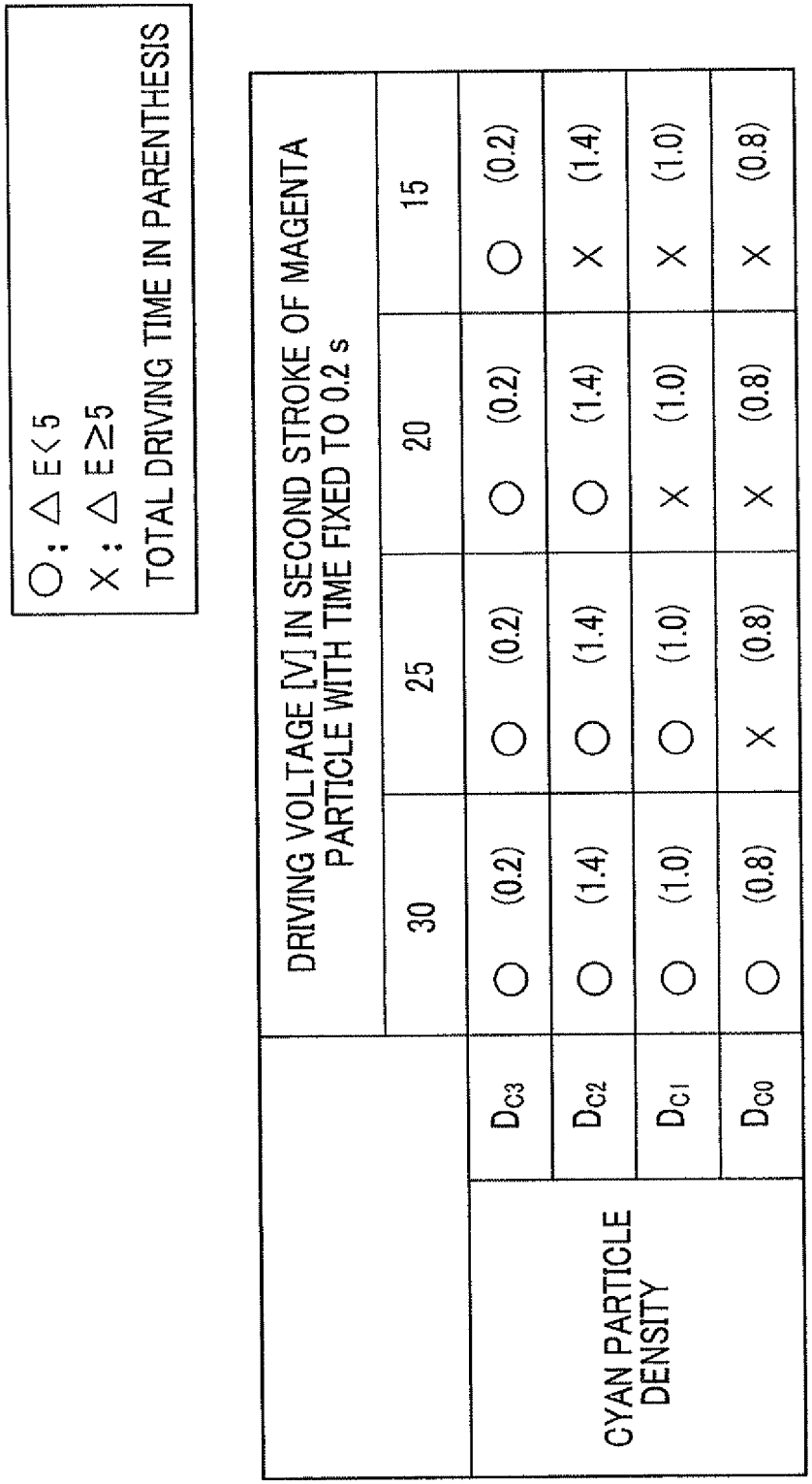
FIG. 22 is a table illustrating the relationship between a voltage in a second stroke of magenta particles and the density and mixed color of cyan particles.

The density of cyan particles, the driving condition in the second stroke of magenta particles, and the mixed color has the relationship shown in FIGS. 20 to 22. The voltage value and the voltage application time of the voltage applied in the second stroke of the cyan particles C and the density exhibit the relationship shown in FIG. 23.

FIGS. 20 and 21 show the results when the voltage value is fixed and the voltage application time is changed, where the voltage value in FIG. 20 is fixed to 15 V and the voltage value in FIG. 21 is fixed to 30 V. FIG. 22 shows the result when the voltage application time is fixed and the voltage value is changed.

The mixed color is evaluated using a color difference $\Delta E$ (the square root of the sum of squares of differences in L* axis, a* axis, b* axis) from displayed cyan in a state where no mixed color present. When $\Delta E<5$, it is evaluated as no mixed color: O. When $\Delta E \geqq 5$, it is evaluated as mixed color: X.

As can be seen from the comparison of the results shown in FIGS. 21 and 22, it is possible to shorten the total driving time by fixing the voltage value and changing the voltage application time.

In the past, the driving conditions in the second stroke of the magenta particles M are fixed (the leftmost conditions in FIGS. 20 to 22). As a result, it can be seen that the total driving time is longer than that in the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium driver including a display substrate that has translucency, a rear substrate that is opposed to the display substrate with a gap interposed therebetween, a dispersion medium that is enclosed between the display substrate and the rear substrate, a first particle group that is dispersed in the dispersion medium and that migrates by applying a first voltage of which an absolute value is equal to or greater than a first threshold value across the substrates, and a second particle group that is dispersed in the dispersion medium and that migrates by applying a second voltage of which an absolute value is equal to or greater than a second threshold value less than the first threshold value across the substrates, the driver comprising:

a setting unit that sets a voltage value and a voltage application time of the first voltage with which the first particle group does not migrate at the time of causing the second particle group to migrate depending on a display density of the second particle group when the second particle group is caused to migrate after the first particle group is caused to migrate; and a voltage application unit that first applies the first voltage set by the setting unit across the substrates and then applies the second voltage across the substrates by applying the first voltage across the substrates so that the first particle group migrates to one of the display substrate and the rear substrate and the second particle group migrates the other of the display substrate and the rear substrate, applying the first voltage, which is set by the setting unit and corresponds to the display density of the first particle group, across the substrates, and applying the second voltage, the absolute value of which is less than the first threshold value and equal to or greater than the second threshold value and which corresponds to the display density of the second particle group, across the substrates.

2. A non-transitory computer-readable medium storing a program causing a computer to function as the units of the driver according to claim 1.

3. A display medium driver including a display substrate that has translucency, a rear substrate that is opposed to the display substrate with a gap interposed therebetween, a dispersion medium that is enclosed between the display substrate and the rear substrate, a first particle group that is dispersed in the dispersion medium and that migrates by applying a first voltage of which an absolute value is equal to or greater than a first threshold value across the substrates, and a second particle group that is dispersed in the dispersion medium and that migrates by applying a second voltage of which an absolute value is equal to or greater than a second threshold value less than the first threshold value across the substrates, the driver comprising:

a setting unit that (i) sets a voltage value and a voltage application time of the first voltage with which the first particle group does not migrate at the time of causing the second particle group to migrate depending on a display density of the second particle group when the second particle group is caused to migrate after the first particle group is caused to migrate, and (ii) fixes the voltage value of the first voltage and changes the voltage application time of the first voltage depending on the display density of the second particle group; and a voltage application unit that first applies the first voltage set by the setting unit across the substrates and then applies the second voltage across the substrates by applying the first voltage across the substrates so that the first particle group migrates to one of the display substrate and the rear substrate and the second particle group migrates to the other of the display substrate and the rear substrate, applying the first voltage, which is set by the setting unit and corresponds to a display density of the first particle group, across the substrates, and applying the second voltage, the absolute value of which is less than the first threshold value and equal to or greater than the second threshold value and which corresponds to the display density of the second particle group, across the substrates.

4. A display device comprising:

a display medium including a display substrate that has translucency, a rear substrate that is opposed to the display substrate with a gap interposed therebetween, a dispersion medium that is enclosed between the display substrate and the rear substrate, and a plurality of types of particle groups that are dispersed in the dispersion medium, that are enclosed between the substrates so that the particles groups migrate between the substrates depending on an electric field formed between the substrates, and that are different from each other in color and charged polarity; and a display driver including a setting unit that sets a voltage value and a voltage application time of the first voltage with which the first particle group does not migrate at the time of causing the second particle group to migrate depending on a display density of the second particle group when the second particle group is caused to migrate after the first particle group is caused to migrate, and a voltage application unit that first applies the first voltage set by the setting unit across the substrates and then applies the second voltage across the substrates.

* * * * *